(12) United States Patent
Lewis

(10) Patent No.: US 6,271,512 B1
(45) Date of Patent: Aug. 7, 2001

(54) OPTICAL SYSTEM FOR DETECTING OBSTRUCTION

(75) Inventor: Robert Alden Lewis, Sunnyvale, CA (US)

(73) Assignee: Infineon Technologies Corporation, San Jose, CA (US)

( * ) Notice: Subject to any disclaimer, the term of this patent is extended or adjusted under 35 U.S.C. 154(b) by 0 days.

(21) Appl. No.: 09/288,588

(22) Filed: Apr. 8, 1999

Related U.S. Application Data

(60) Provisional application No. 60/081,621, filed on Apr. 13, 1998.

(51) Int. Cl.[7] ................................ H01J 40/14; H02P 3/00
(52) U.S. Cl. ..................... 250/221; 250/214 R; 318/434; 318/469; 49/26
(58) Field of Search ................................ 250/221, 222.1, 250/214 R, 214 AL, 214 C, 214 B, 208.2; 318/264, 265, 266, 434, 466, 467, 469, 280; 49/26, 28; 340/555; 187/317

(56) References Cited

U.S. PATENT DOCUMENTS 4,621,452  11/1986  Deeg .
5,166,586  11/1992  Yaguchi ............................... 318/434
5,326,967  * 7/1994  Herrmann et al. ................... 250/221
5,410,149  4/1995  Winston, Jr. et al. ............... 250/221
5,754,017  5/1998  Tsuge et al. ......................... 318/286
6,157,024  * 12/2000  Chapdelaine et al. ............... 250/221

FOREIGN PATENT DOCUMENTS 0 486 430  5/1992  (EP) .
94 22212  9/1994  (WO) .

* cited by examiner

*Primary Examiner*—John R. Lee
*Assistant Examiner*—Kevin Pyo

(57) ABSTRACT

An obstruction detection system utilizes a segmented optical detector and detector-specific signal processing to optically detect the presence of a small object within a defined plane and to screen out interfering signals. In one application, the obstruction detection system is utilized with an automatically closing window to prevent small objects, such as fingers, from being pinched by the window as the window is being closed. In one embodiment of the obstruction detection system, the segmented optical detector includes a series of segmented detector elements that are generally perpendicular to the defined plane. In another embodiment of the obstruction detection system, the segmented optical detector includes segmented detector elements that are generally parallel to the defined plane.

20 Claims, 11 Drawing Sheets

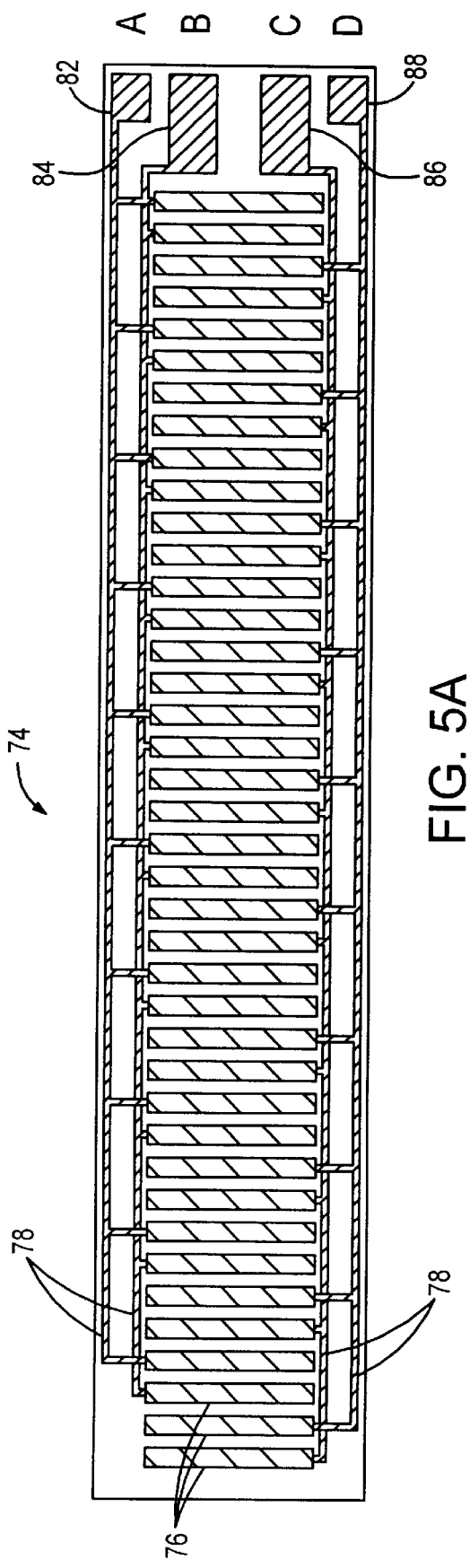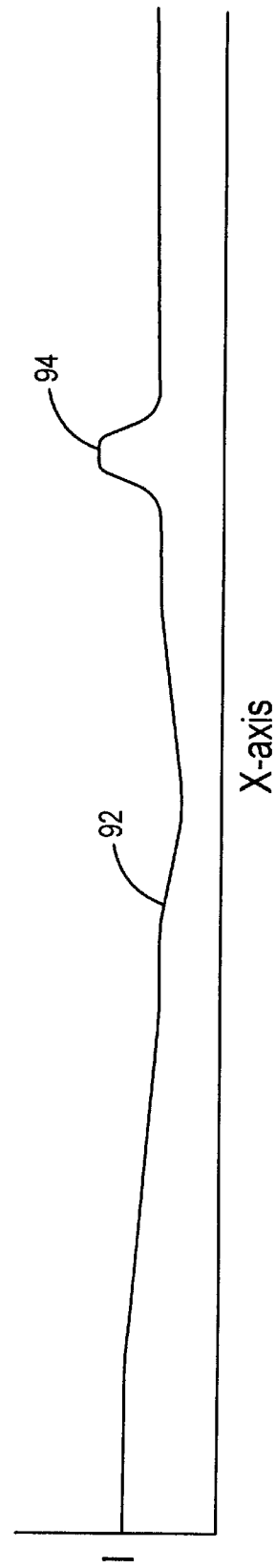
FIG. 5A
FIG. 5B

OPTICAL SYSTEM FOR DETECTING OBSTRUCTION

This application claims the benefit of U.S. Provisional Application No. 60/081,621, filed Apr. 13, 1998.

BACKGROUND OF THE INVENTION

The present invention relates to the optical detection of a small object within a fixed plane, and more particularly the invention relates to an optical detection system that prevents objects such as hands and fingers from being pinched by a power window of an automobile as the window closes.

DESCRIPTION OF THE RELATED ART

Various techniques that rely on the measurement of applied force have been utilized to detect obstructions in the plane of an open automobile window. Presently, the indirect measurement of mechanical force applied by a window is the leading solution. Indirect measurement of mechanical force involves estimating the required torque of a window motor based upon the position of the window, window weight, closing rate, and mechanical advantage. The amount of force applied by the window motor is estimated based on the window motor current and on the window motor rotation rate. If the estimated force applied by the window motor exceeds the estimated torque requirement, the window motor is stopped or reversed.

The compressive force of a window against an obstructing object can also be directly measured by a compressive membrane located within a window gasket of a window frame. If force is applied to the membrane non-uniformly, as in the case of an object trapped between the window and the window frame, the membrane is pinched and the window motor is stopped or reversed. Although the techniques relying on the measurement of mechanical force may work well for their intended purposes, detection of an obstruction within the window plane requires direct contact between the obstructing object and the window. For example, an arm must weigh down the window or a finger must be partially pinched between the window and the window frame before stoppage or reversal of the motor is triggered.

Optical detection techniques are also utilized for detecting obstructions in the plane of an object that is closing. Known techniques involve measuring the attenuation of a signal through an optical waveguide or measuring the change of capacitance in a multilayer capacitor structure. While these techniques may work well for their intended purpose, there are important design considerations that these techniques may not adequately address.

A critical design consideration for an optical obstruction detection system for use in an automobile having power windows is that the system must be able to detect a small object, such as a finger, that is located in the plane of an open window. Detection of a small object is difficult, because the signal response is often hard to distinguish from various background and/or interfering signals. The various background and/or interfering signals may be caused, for example, by the movement of the window or reflections from a person that is seated near the window. The optical sensing circuitry must be able to distinguish interfering signals caused by direct sunlight or scattered light that is incident on the detectors of the obstruction detection system.

In view of the prior art shortcomings, what is needed is an optical detection system that has the sensitivity to detect small obstructing objects and the ability to distinguish interfering signals (e.g., from the closing of a window) in order to prevent false detections of an obstructing object when no obstructing object is actually present.

SUMMARY OF THE INVENTION

An obstruction detection system utilizes a segmented optical detector and detector-specific signal processing to optically detect the presence of a small object within a defined plane and to screen out interfering signals. In one embodiment of the obstruction detection system, the segmented optical detector includes a series of segmented detector elements that are generally perpendicular to the defined plane. In another embodiment, the segmented optical detector includes segmented detector elements that are generally parallel to the defined plane. In the preferred application, the system is utilized with an automatically closing window to prevent small objects, such as fingers, from being pinched by the window.

The complete obstruction detection system includes an optical emitter, the segmented optical detector, and a signal processor. The system is ultimately connected to a window motor controller and a window motor so that closing of a window can be halted if an obstruction is detected. In the preferred embodiment, the optical emitter is a laser diode and the segmented optical detector is an array of photodiodes. Both the optical emitter and the segmented optical detector are located in a single corner of a window frame. The optical emitter projects light toward the interior of the window frame. The segmented optical detector receives portions of the emitted light that are reflected by the interior of the window frame, by an obstructing object, and/or by other nearby objects or surfaces.

The preferred signal processor is an application-specific integrated circuit (ASIC) that detects differences in the amount and pattern of light that is reflected when there is an obstruction in the plane of the window versus the amount and pattern of light that is reflected when there is no obstruction in the plane of a window. If the signal processor determines that there is an obstruction in the window plane, the signal processor generates a signal that is used to disable or reverse the window motor. The detection algorithm that is utilized by the signal processor depends upon the type of segmentation that is utilized for the segmented optical detector. Two alternative embodiments of the segmented optical detector and signal processor are described in further detail below.

In the first embodiment, the segmented optical detector is formed of detector elements that are generally perpendicular to the window plane. The segmented detector elements are interconnected by separate conductive traces that are ultimately connected to related signal pads. In one embodiment, the segmented detector elements are divided into four separate groups and each detector element is connected to one and only one signal pad by a respective conductive trace. The four detector groups are distributed in a repeating pattern and the detector elements are spaced apart at distances that optimize the detection of a small object, such as a finger. The segmented optical detector is oriented, with respect to the window plane, such that the lengthwise (horizontal) dimension of the detector is generally parallel to the window frame and such that the segmented detector elements are generally perpendicular to the window plane.

A spatial filtering algorithm is implemented by the signal processor in conjunction with the segmented optical detector in order to distinguish gradual spatial changes in light intensity from abrupt changes in light intensity. The gradual changes are typically caused by interference, or the illuminated background while the abrupt changes in intensity are likely to be caused by the presence of a small object. The spatial filtering algorithm involves summing the signals received from different combinations of the segmented detector elements and comparing the sums. The circuitry required to implement the preferred spatial filtering algorithm is contained within the signal processor. Within the signal processor, the segmented detector groups are connected to group-specific signal amplifiers and then to a processing circuit that performs the sum and difference functions of the spatial filtering algorithm. The results of the functions are forwarded to absolute value units, where the absolute value of each function is obtained. The absolute values are then transmitted to a comparator unit and compared to a reference signal in order to determine if either signal deviates from the reference signal enough to trigger a condition that is responsive to the presence of an obstructing object.

In the other embodiment, the segmented optical detector includes detector elements that are generally parallel to the window plane. In a preferred embodiment, there are multiple narrow detector elements that are spaced closely together on one side of the detector and there is a single wide detector element on the opposite side of the detector. Each of the segmented detector elements is individually connected to a signal processor, so that each detector element can be individually sampled. The detector is preferably oriented such that the narrow detector elements are closest to, and in parallel with, the window plane.

The narrow detector elements are provided to minimize false detections that may be caused by the motion of a closing window or by direct exposure to sunlight. The narrow detector elements minimize false detections of objects moving from outside the window plane to inside the window plane (e.g., the motion of a closing window) by monitoring changes in optical energy across the lateral direction of the detector. Narrow detector elements reduce the susceptibility of the system to false detections caused by direct exposure to sunlight by enabling a specific detector element to be deactivated or ignored when the specific element is in direct contact with sunlight. The signal processor utilized with the segmented detector elements controls detector sampling and solar detection. Through the signal processor, the segmented detector elements can be individually sampled to provide greater sensitivity to the parallel distribution of light upon the segmented detector. In addition, as previously noted, specific parallel segmented detector elements can be turned off when the elements are exposed to direct sunlight.

BRIEF DESCRIPTION OF THE DRAWINGS

FIG. 5A is a top view of a segmented optical detector in accordance with the invention.

FIG. 5B is a graph of reflected light intensity across the horizontal length of the segmented optical detector shown in FIG. 5A.

DETAILED DESCRIPTION

Figure 1:
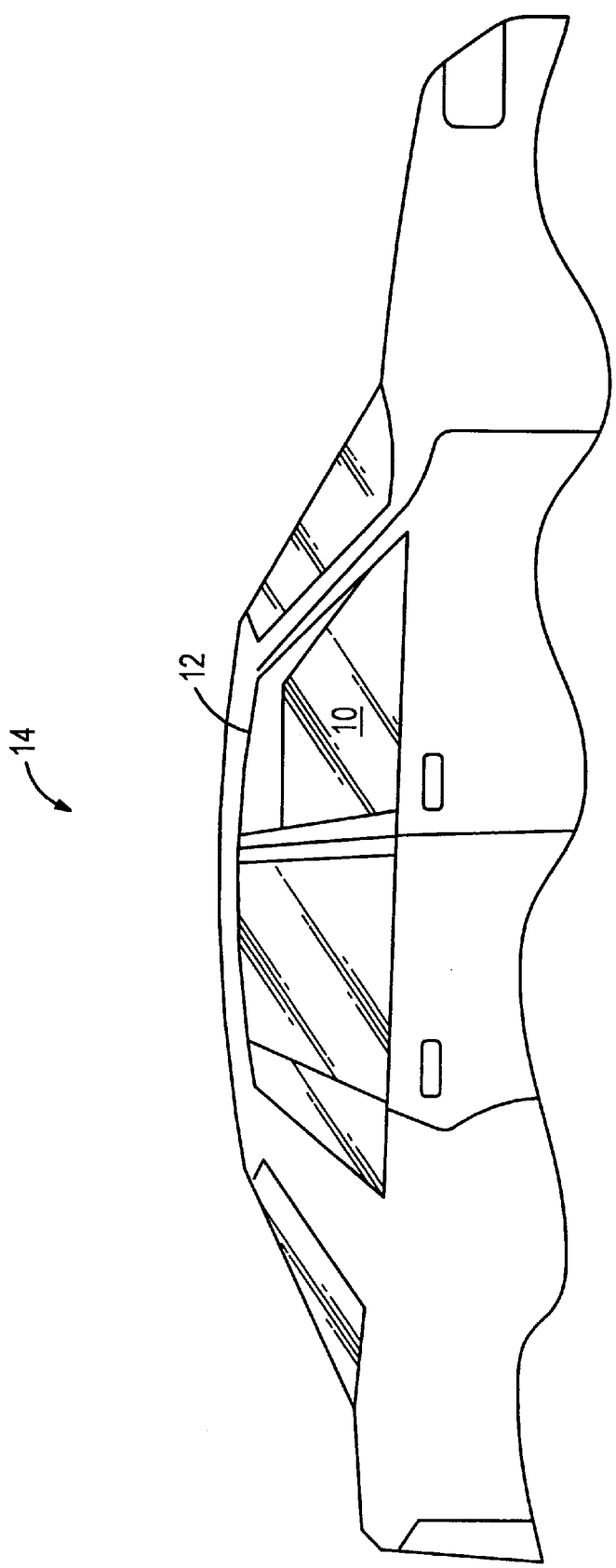
FIG. 1 is a depiction of a conventional automobile with a partially opened front window.

Referring to FIG. 1, the preferred embodiment of the present invention is described in terms of an optical system for detecting an obstruction between an open window 10 and a window frame 12 of an automobile 14. Detecting an obstruction within the plane defined by the window and window frame is especially important in automobiles having power windows that can completely close by momentarily activating a button. If there is no means for detecting whether or not there is an obstruction, such as a person's finger, in the path of the window, the obstruction may become pinched between the closing window and the window frame.

Figure 2:
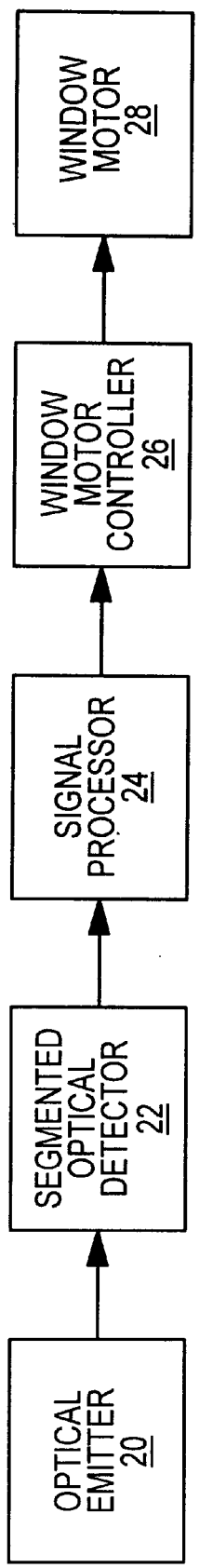
FIG. 2 is a general block diagram of an obstruction detection system that utilizes optical detection in accordance with the invention.

FIG. 2 is a general block diagram of an obstruction detection system that utilizes optical detection to prevent inadvertent window pinching. The obstruction detection system comprises an optical emitter 20, a segmented optical detector 22, and a signal processor 24. The obstruction detection system is connected to a window motor controller 26 and a window motor 28, so that closing of a window can be halted if an obstruction is detected. In an embodiment, the optical emitter may be, for example, one or more light emitting diodes (LEDs) or one or more lasers. LEDs are preferred when wide beams (measured perpendicular to the window plane) are desired and lasers are preferred when narrow beams are desired. The segmented optical detector is an array of photodiodes. Examples of detection systems having different detector segmentation arrangements are described in further detail below.

In the preferred embodiment, both the optical emitter 20 and the segmented optical detector 22 are located in the same corner of a window frame. The optical emitter generates light toward the interior of the window frame. The segmented optical detector receives those portions of the emitted light energy that are reflected by the interior of the window frame, by an obstructing object, and/or by other nearby objects or surfaces. Light that is reflected from the interior of the window frame and/or from other nearby objects that are not obstructing closure of the window is generally referred to as background and/or interfering light. The background/interfering light creates background/interfering electrical signals upon impacting the optical detectors. The background/interfering signals must then be distinguished from signals that are caused from objects that are obstructing the window. In a preferred embodiment of the invention, there is no special surface on or near the window frame for reflecting light, but other embodiments may utilize such a surface.

The signal processor 24 may comprise a general-purpose microprocessor, a digital signal processor, an application-specific integrated circuit (ASIC), or other processing means. The signal processor may be located near the optical emitter 20 and the segmented optical detector 22, or it may be remotely located. For example, if there is sufficient processing power elsewhere within the automobile, signals from the segmented optical detector may be processed by a general-purpose processor that also performs other functions. The required processing may also be split between a processor located near the optical detector and a remote processor.

The signal processor 24 generally detects differences in the amount and pattern of light that is reflected when there is an obstruction in the plane of the window versus the amount and pattern of light that is reflected when there is no obstruction in the plane of a window. In the present invention, the segmented optical detector 22 and signal processor 24 combination must be able to discriminate small signal changes (potentially in the nano-watt range) from constant background signals (potentially in the micro-watt range). If the signal processor determines that there is an obstruction in the window plane, it generates a signal that is used to disable or reverse the window motor that provides the power for closing the window. The detection algorithm utilized by the signal processor depends on the segmentation arrangement utilized by the detector. Signal processor designs specific to the different detector arrangements are described in further detail below.

Figure 3A:
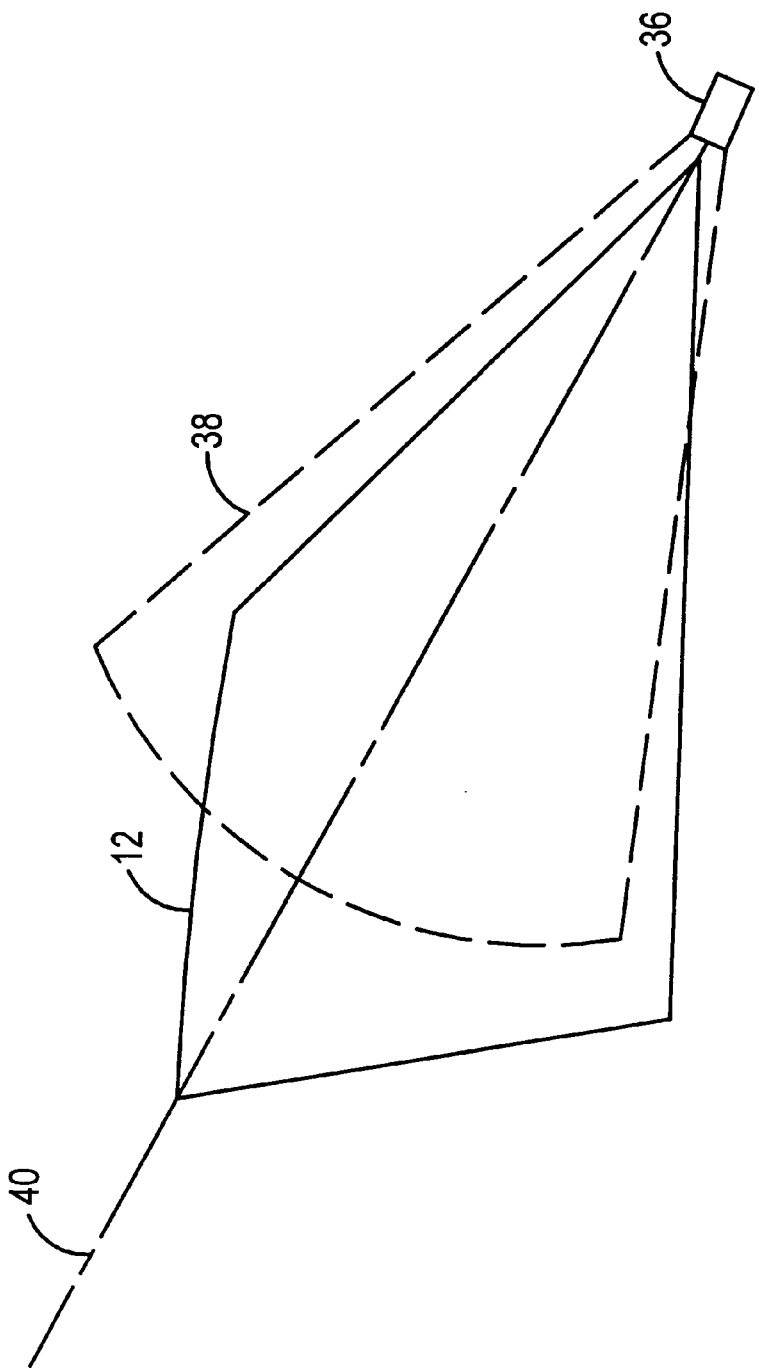
FIG. 3A is a depiction of the general location of an obstruction detection system in relation to the front window frame of the automobile shown in FIG. 1, in accordance with the invention.

FIG. 3A illustrates the general location of an obstruction detection system 36 in relation to the front window frame 12 of the automobile 14 shown in FIG. 1. The obstruction detection system generates light energy that propagates away from the obstruction detection system, toward the inside of the window frame. The pattern of illumination 38 created by the obstruction detection system preferably defines a two-dimensional arc in the plane of the window. At a minimum, the illumination pattern covers the upper portion of the window frame, where a small object would be pinched as the window engages the window frame. In order to reduce false detections, the light energy should generally be restricted to a plane generally defined by the window frame. It has been found that the strength of signals returned to the detection system generally follows the relationship $I/R^3$, where I is the signal intensity and R is the distance from the detection system to a given point on the window frame. Given the $I/R^3$ relationship, the light intensity pattern is preferably distributed within the window plane to provide more constant return signals to the detection system. In one embodiment, a laser source of 0.5 W is utilized with approximately 20% of the laser's power being distributed within ±5 degrees of a center axis 40 that travels from the lower front corner of the front window to the upper back corner of the front window.

Figure 3B:
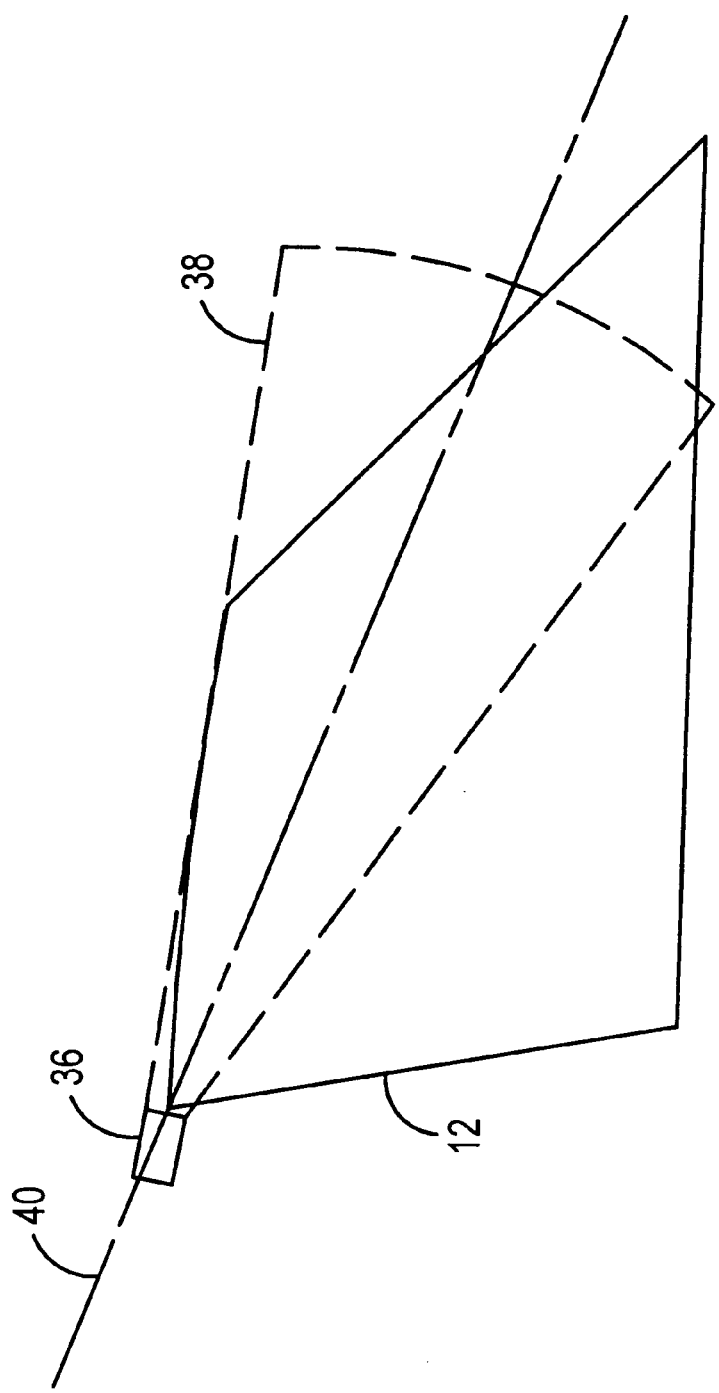
FIG. 3B is another depiction of the general location of an obstruction detection system in relation to the front window frame of the automobile shown in FIG. 1 in accordance with the invention.

The dashed lines in FIG. 3A generally show the shape of the illumination pattern 38. However, FIG. 3A is not intended to show the extent of the illumination. In order to provide complete detection coverage, the light energy must extend to the far corner of the window frame. In one embodiment, light emitted from a single optical emitter is tailored to the geometry of the window frame. That is, higher intensity light is directed to the areas of the window frame that are furthest away from the obstruction detection system 36. In another embodiment, multiple optical emitters are utilized to create a distribution of light that is tailored to the window frame. Although the obstruction detection system is located in the lower (A pillar) corner of the window frame, the system can be placed in alternate locations, such as the upper (B pillar) corner of the window frame. FIG. 3B is a depiction of the obstruction detection system 36, and the illumination pattern 38 in relation to the window frame 12 when the obstruction detection system is located in the upper (B pillar) corner of the window frame.

Figure 4:
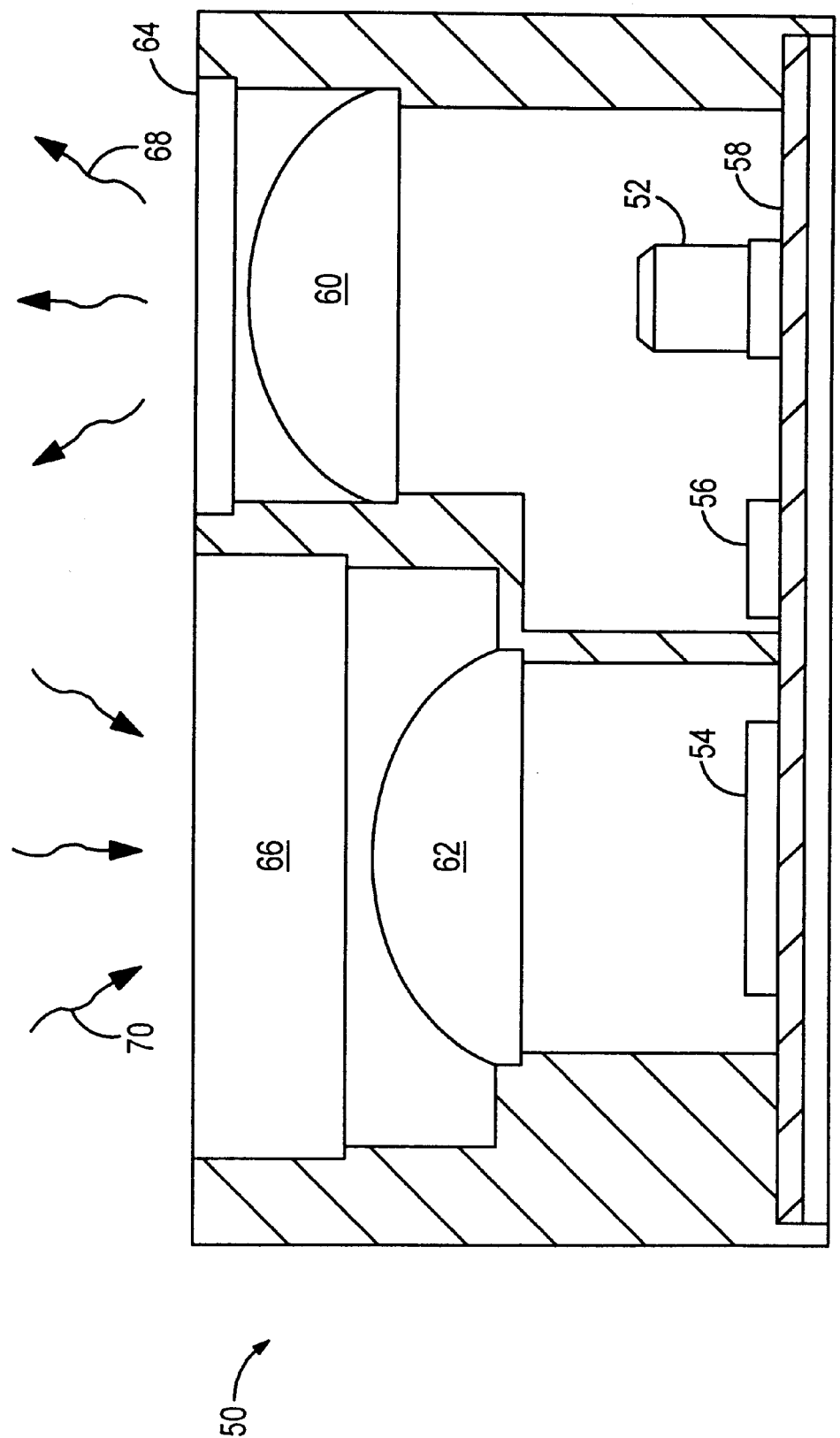
FIG. 4 is a depiction of a preferred obstruction detection module in accordance with the invention.

FIG. 4 shows the components of a preferred obstruction detection module 50. The obstruction detection module 50 comprises an optical emitter 52, a segmented optical detector 54, an optional transmit power detector 56, a printed circuit board 58, a transmit lens 60, a receiver lens 62, a fan generator lens 64, and an infrared pass filter 66. In this embodiment, the optical emitter is a laser, which provides greater control over the illumination pattern than an LED. In particular, use of a laser allows a larger proportion of the total light energy to be directed toward the far corner of the window frame 12 shown in FIGS. 3A and 3B. This increases the signal-to-noise ratio for detecting obstructions in the far corner region of the window frame, which is desirable because of the increased distance between the detection module 50 and the far corner of the window frame. The transmit lens and the fan generator lens direct the light from the optical emitter and further define the illumination pattern. In a preferred embodiment, the optical emitter is aligned to project and detect light that travels in the plane that is just inside the closed window. Other alignments are possible and alignment tolerances must be considered. Alignment tolerances must be considered because it is difficult to have exactly uniform alignment on each installation and because the alignment may be slightly changed after installation from slamming doors and such.

The optical transmit power detector 56 may comprise a photodiode, which detects and monitors the intensity of light generated by the optical emitter 52. The transmit power detector provides an indication of the overall intensity of light that is generated by the optical emitter and subsequently transmitted through the transmit lens 60 and the fan generator lens 64. Monitoring the transmit power allows the signal processor 24 to normalize the signals that are received by the segmented optical detector 22 and 54 to account for fluctuations in transmit power.

In the obstruction detection module 50 of FIG. 4, the light 68 generated by the optical emitter 52 and the light 70 received by the segmented optical detector 54 is preferably in the infrared region of the light spectrum. The infrared pass filter 66 allows infrared light to pass through to the detector, but generally blocks light within other wavelength bands. This aspect of the invention reduces the effect that other light sources have on the signals generated by the segmented optical detector. The receiver lens 62 focuses received light onto the segmented optical detector.

As mentioned above, the obstruction detection system is preferably implemented with either one of two segmented detector arrangements. The first segmented detector arrangement includes optical detector elements that are generally perpendicular to the window plane and the second segmented detector arrangement includes optical detector elements that are generally parallel to the window plane. Both segmented detector arrangements include signal processors that are specific to the particular detector arrangement.

FIG. 5A illustrates a top view of one arrangement of the segmented optical detector 74 of FIGS. 2 and 4 in greater detail. FIG. 5A illustrates a layout of a segmented optical detector that includes a series of segmented detector elements 76 that are segmented such that the detector elements are generally perpendicular to the window plane and interconnecting conductive traces 78. There are four separate traces 78, each connected to a different signal pad 82, 84, 86, and 88. Each detector element 76 is connected to one and only one signal pad by a respective trace. The leftmost optical detector element is connected to signal pad 86, the next optical detector element (to the right) is connected to signal pad 88, the next optical detector element is connected to signal pad 84, and the next optical detector element is connected to signal pad 82. This pattern is repeated throughout the segmented optical detector. The detector elements are spaced apart at distances that optimize the detection of a small object, such as a finger. In an embodiment, the detector elements are separated at a pitch of 250 microns. The segmented optical detector is oriented, with respect to the window plane, such that the lengthwise (horizontal) dimension of the detector is in the same plane as (generally parallel to) the window frame, and such that the segmented detector elements are generally perpendicular to the window plane. In a preferred embodiment, an obstruction detection system utilizing the perpendicular detector elements is located in the upper B pillar corner of the window. This is preferred because the perpendicular detectors are less adept at compensating for direct sunlight contact. Although FIG. 5A represents one example of a segmented optical detector with perpendicular detector elements, other segmented detector arrangements having generally perpendicular detector elements are possible.

FIG. 5B is an example of a graph of reflected light intensity 92 across the horizontal length (x-axis) of the segmented optical detector. As shown, the intensity of light varies gradually over the majority of the detector. However, the light intensity has a sharp increase 94 caused the reflection of emitted light by a small object that is located in the plane of the window. The small object may be a finger that extends through an open window in the plane defined by the window and the window frame.

A significant problem in detecting the presence of a small object involves distinguishing sharp changes in light intensity, such as shown in FIG. 5B, from gradual spatial changes in light intensity. For example, the overall change in light intensity may be the same for a gradual change (e.g., caused by the window moving near the beam) and for a sharp change (e.g., caused by a finger in the window plane), yet, when applied to obstruction detection, a response is typically desired only for a sharp change in light intensity. Most often, gradual changes in light intensity are the result of interference from direct sunlight or scattered light from a nearby large object or from a closing window. A spatial filtering algorithm is implemented in conjunction with the segmented optical detector in order to distinguish gradual changes in light intensity from sharp changes in light intensity.

Figure 5C:
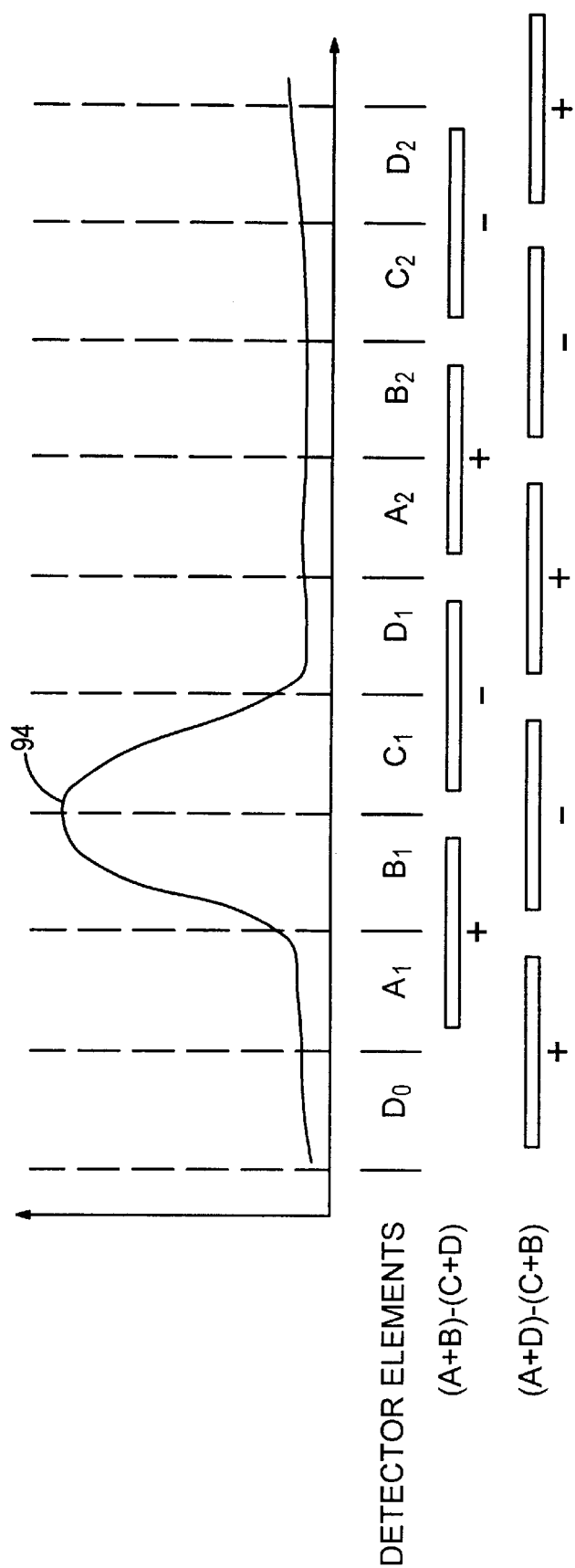
FIG. 5C is an expanded graph of the sharp light intensity change of FIG. 5B and the spatial filtering algorithm of the invention.

Referring to FIG. 5C, which includes an expanded graph of the sharp light intensity change 94 of FIG. 5B, the spatial filtering algorithm involves summing the signals received from different combinations of the segmented detector elements and then comparing the sums. The algorithm involves comparing the sum of $\{(A+B)-(C+D)\}$ to the sum of $\{(A+D)-(C+B)\}$. FIG. 5C shows the reflected light intensity on the A, B, C, and D detector elements for a portion of the total elements. Referring to the first summing line, A+B is the sum of the signals from the $A_1$ and $B_1$ elements. C+D is the sum of the signals from the $C_1$ and $D_1$ elements. As shown in FIG. 5C, the sum of optical energy received by the combined elements of $A_1+B_1$ is approximately equal to the sum of optical energy received by the combined elements of $C_1+D_1$, and therefore the difference between the two sums is a small response.

In contrast, referring to the second summing line, A+D is the sum of the signals from detector elements $D_0$ and $A_1$, both of which are receiving relatively low intensity reflected light. C+B is the sum of the signals from the detector elements $B_1$ and $C_1$, both of which are receiving relatively high intensity reflected light. The difference between the sums gives a high response, thereby identifying a small object that is reflecting light onto the segmented detector array. It should be noted that although the summing algorithm is described with reference to only four detector elements, in operation, the sums are combined measurements of all of the connected detector elements. That is, the signal related to the "A" signal pad includes the reflected light that is incident on all of the A detector elements (e.g., $A_1+A_2\ldots$). Likewise, the signals on the B, C, and D signal pads include the reflected light that is incident on all of the B, C, and D detectors respectively (e.g., $B_1+B_2\ldots$, $C_1+C_2\ldots$, $D_1+D_2\ldots$). In a preferred embodiment, signal response is optimum for light intensity spikes that span less than the width of two detector elements.

Figure 6:
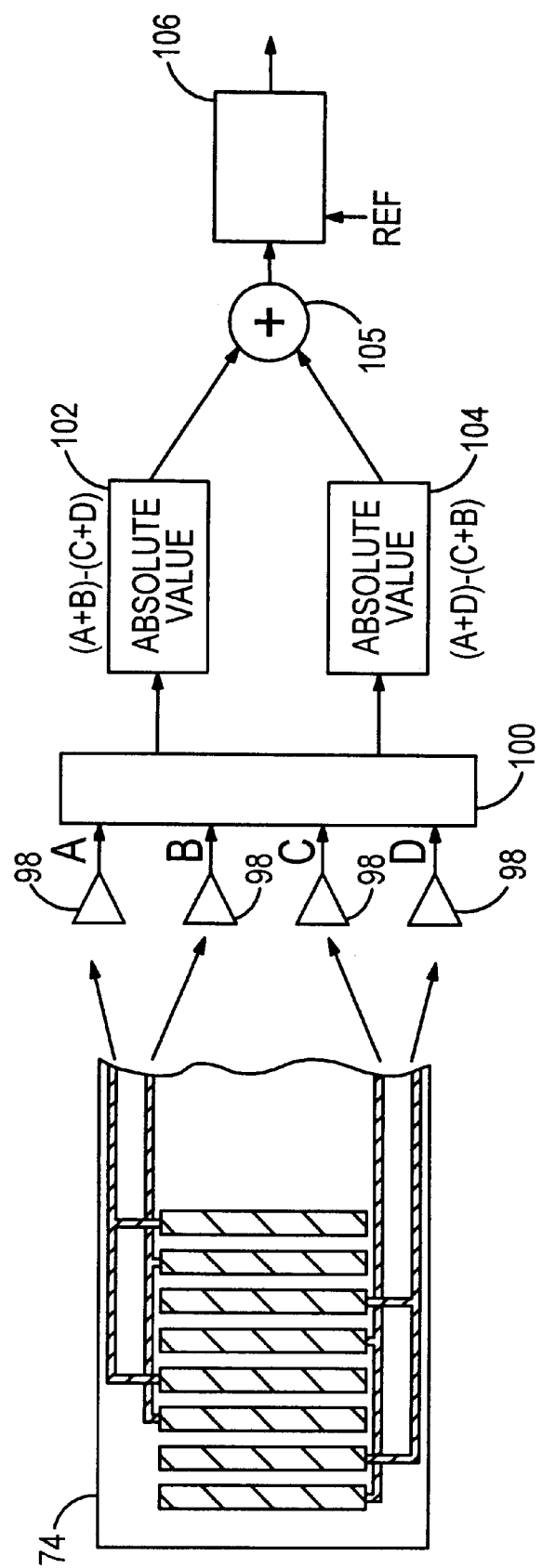
FIG. 6 is a depiction of a portion of the segmented optical detector of FIG. 5A and the preferred logic blocks for implementing the spatial filtering algorithm in accordance with the invention.

FIG. 6 is a depiction of a portion of the segmented optical detector 74 of FIG. 5A and the preferred logic blocks for implementing the spatial filtering algorithm. The A, B, C, and D segmented detector elements are initially connected to signal amplifiers 98 and then to a processing block 100 that performs the two sum and difference functions $\{(A+B)-(C+D)\}$ and $\{(A+D)-(B+C)\}$. The results of the two functions are forwarded to absolute value units 102 and 104, where the absolute value of each function is obtained. The absolute values are then transmitted to a summing unit 105 and a comparator 106 and compared to a reference signal in order to determine if either signal deviates from the reference signal enough to trigger a response that represents an obstructing object. The preferred logic blocks are incorporated into the signal processor.

Although not shown in FIG. 6, the signal processor may include a gain calibration function. The gain calibration function adjusts the filtering algorithm values to zero in an initial start up routine. Gain calibration may be accomplished by, for example, multiplying a sum values by a calibration constant.

Figure 7:
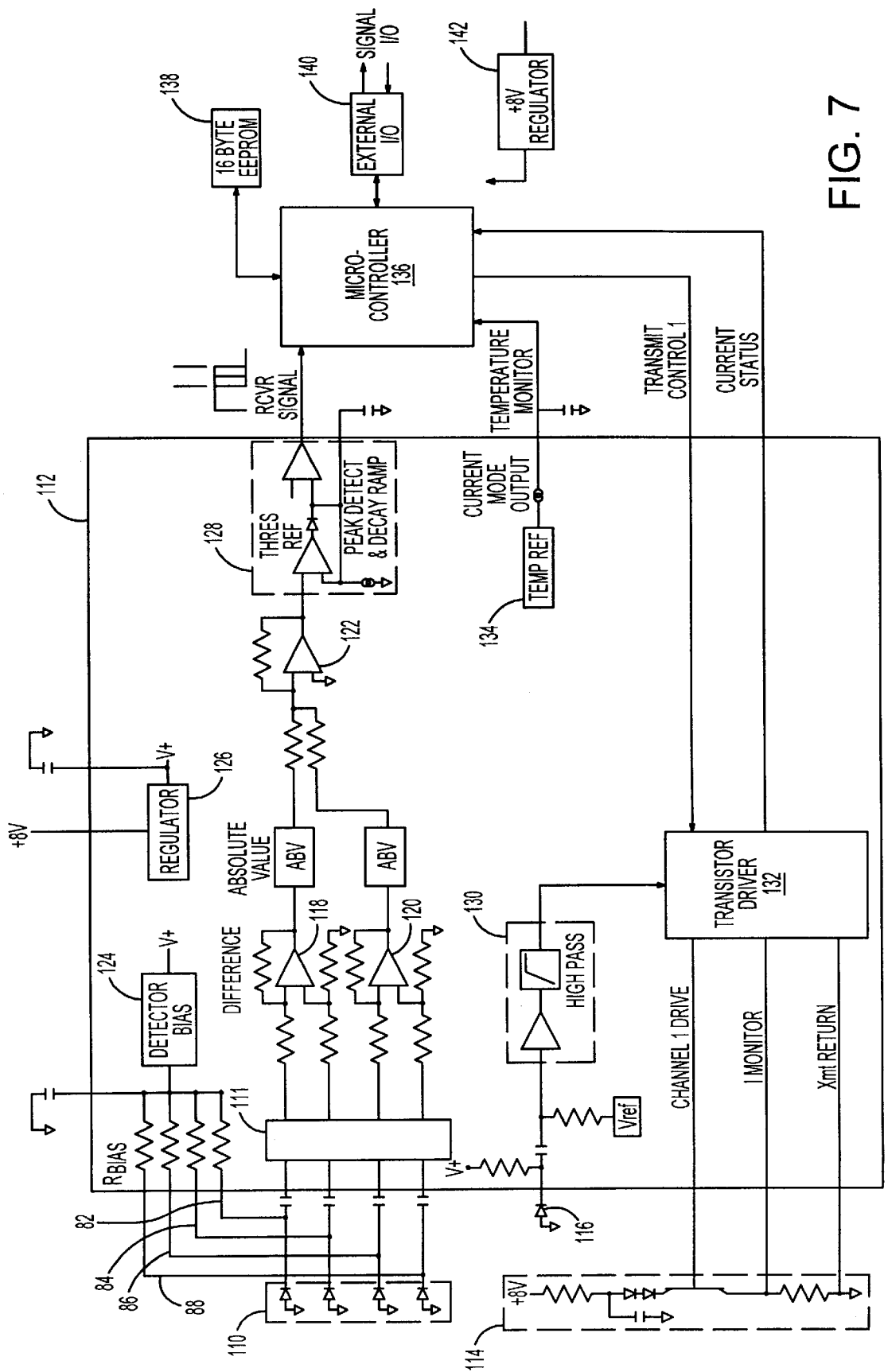
FIG. 7 is a general schematic diagram of one embodiment of the obstruction detection system that includes a segmented optical detector and signal processor in accordance with the invention.

FIG. 7 is a general schematic diagram of one embodiment of the obstruction detection system. The segmented optical detector 110 is represented in relation to the signal processor 112 as four discrete photodiodes, although, in the preferred embodiment, the detector comprises a repeating array of detector elements, as illustrated in FIG. 5A. Schematic diagrams of the optical emitter 114 and the transmit power monitor 116 are also shown in relation to the signal processor. In the preferred embodiment, the optical emitter emits light having a relatively narrow beam width in the direction that is perpendicular to the window plane.

Within the signal processor 112, FIG. 7 illustrates a summing network 111 and operational amplifiers (op amps) 118, 120, and 122. Op amp 118 generally provides the difference between the signal sums at pads 82 and 84 and pads 86 and 88. Op amp 120 generally provides the difference between the signal at signal pad 86 and the signal at signal pad 88. Op amp 122 generally sums the outputs from op amps 118 and 120. Additional functional units within the signal processor may include a bias circuit 124, a regulator 126, a peak detection unit 128, a power monitoring subsystem 130, a transistor driver 132, and a temperature reference circuit 134. Additional functional units which may support the obstruction detection system include a microcontroller 136, EEPROM 138, an external I/O unit 140, and a voltage regulator 142. As with FIG. 6, gain control may be incorporated into the system.

The combination of the structure of the segmented optical detector 110 and the operations performed by the op amps 118, 120 and 122 generally provides the spatial filtering algorithm that is described above. According to the spatial filtering algorithm, an object that affects the magnitude of reflected light over a relatively small angle of the illumination pattern (a narrow effect) is emphasized, while an object that affects the magnitude of reflected light over a relatively large angle of the illumination pattern (a broad effect) is not. A thin object placed perpendicular to the plane of the window within the window frame produces a narrow effect, while a large object placed within the window frame produces a broad effect. For a broad effect, the change in intensity of reflected light is detected at a number of groups of detector elements. Because the signals from adjacent detector elements are effectively subtracted from one another, such a gradual change is generally canceled out, so that the output of op amp 122 generally does not reflect a broad effect. For a narrow effect, on the other hand, the change in intensity of reflected light is detected at just a few detectors. Such a change will not be canceled out by the filtering algorithm function, so the output of op amp 122 reflects the change in intensity of reflected light.

The spatial filtering algorithm implemented by the obstruction detection system is advantageous because, as stated above, the primary concern for the preferred embodiment of the invention is a finger being placed in the path of a window that is being automatically closed. In this case, there would be a narrow effect on the reflection pattern and the obstruction would be detected. In contrast, many situations that could cause an incorrect determination that the path is obstructed involve a relatively broad effect on the reflection pattern. For example, the window itself may alter the reflection pattern as it is closed, which could cause the segmented optical detector to conclude that there is an obstruction. Due to its shape, the window could cause a broad effect on the reflection pattern, however the filtering algorithm de-emphasizes this effect. Thus, the filtering algorithm tends to decrease the likelihood of a false detection of an obstruction and increase the likelihood of correctly detecting a real obstruction.

Figure 8:
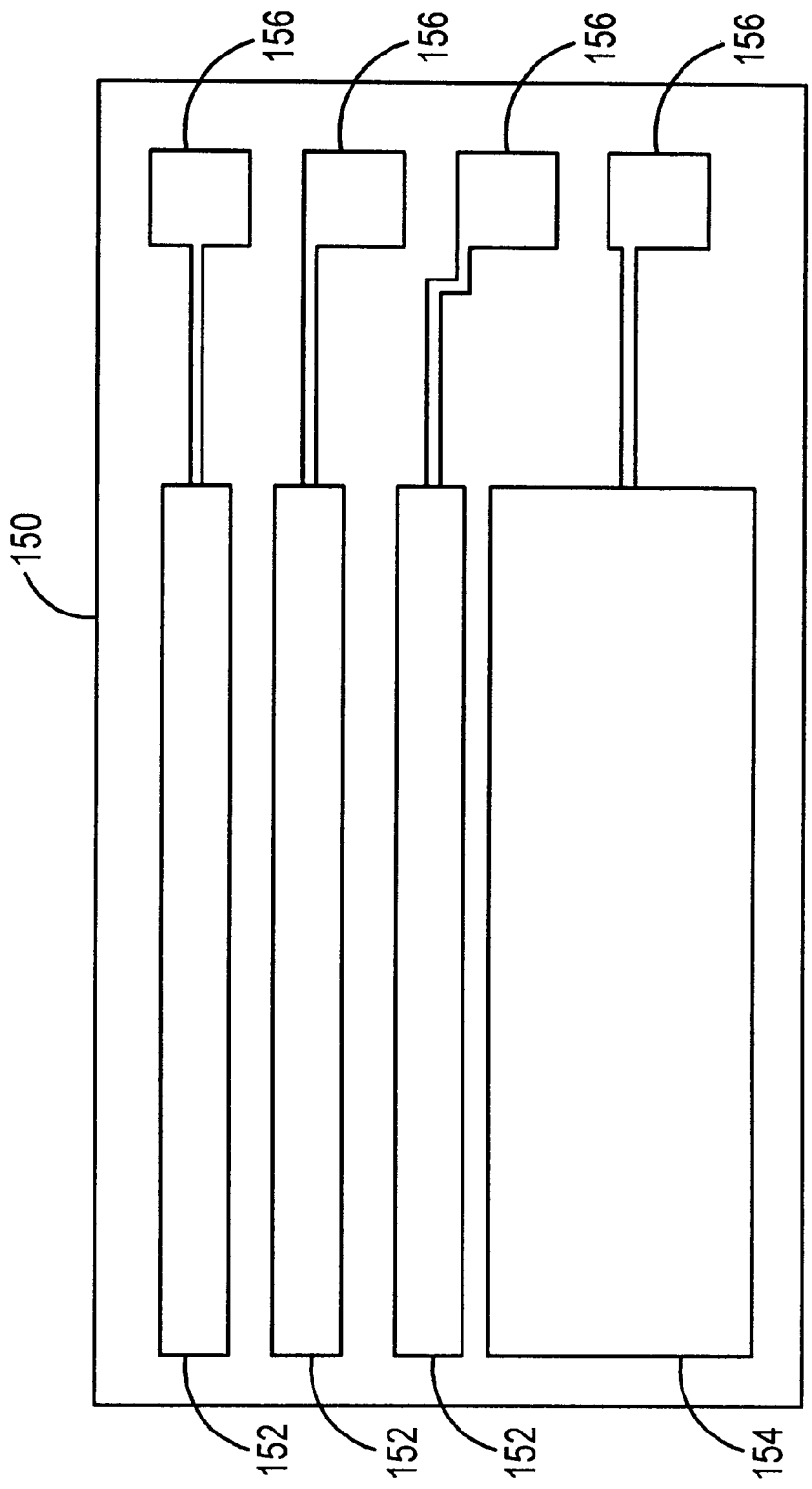
FIG. 8 is a top view of a segmented optical detector in accordance with the invention.

FIG. 8 illustrates another top view of one arrangement of a segmented optical detector of FIGS. 2 and 4. The detector of FIG. 8 is a segmented optical detector 150 that includes an array of detector elements 152 and 154 that are segmented such that the detector elements are generally parallel to the window plane. On one side (top of FIG. 8) of the detector, there are multiple narrow detector elements 152 that are spaced closely together. On the opposite side (bottom of FIG. 8) of the detector, there is a single wide detector element 154. Each of the detector elements is individually connected to a signal pad 156 so that each detector element can be individually sampled by the signal processor. In a preferred embodiment, the detector is oriented such that the multiple narrow detector elements are closest to, and in parallel with, the window plane. In addition, the detector is oriented, with respect to the optical emitter, such that the detector receives light that is reflected from the window frame and any obstructing objects. In a preferred embodiment, an obstruction detection system utilizing the parallel detector elements is located in the lower A pillar corner of the window. The parallel detector elements are adept at compensating for direct sunlight contact because individual detectors that are in contact with direct sunlight can be individually turned off or suppressed. Although FIG. 8 represents one example of a segmented optical detector with parallel detector elements, other segmented detector arrangements are possible.

The narrow detector elements 152 are provided to prevent false detections that may be caused by the motion of a closing window or by direct exposure to sunlight. The narrow detector elements restrict false detections of a closing window by providing increased sensitivity to changes in optical energy in the transversal direction. The narrow detector elements reduce the likelihood of false detections caused by direct exposure to sunlight by enabling a specific detector element to be deactivated or ignored when the specific element is in direct contact with sunlight. That is, if the outermost narrow detector element is exposed to direct sunlight, the detector element can be ignored. In addition, the signature of light intensity changes resulting from window closure can be recognized as the intensity changes from one detector element to the next, especially for interference that comes from outside of the automobile, or that is caused by a closing window. While the parallel segmented detector can compensate for interference that is incident on the narrow detector elements, the wide detector element enables good sensitivity to objects entering the window plane from inside the automobile (e.g., a finger from a passenger).

Figure 9:
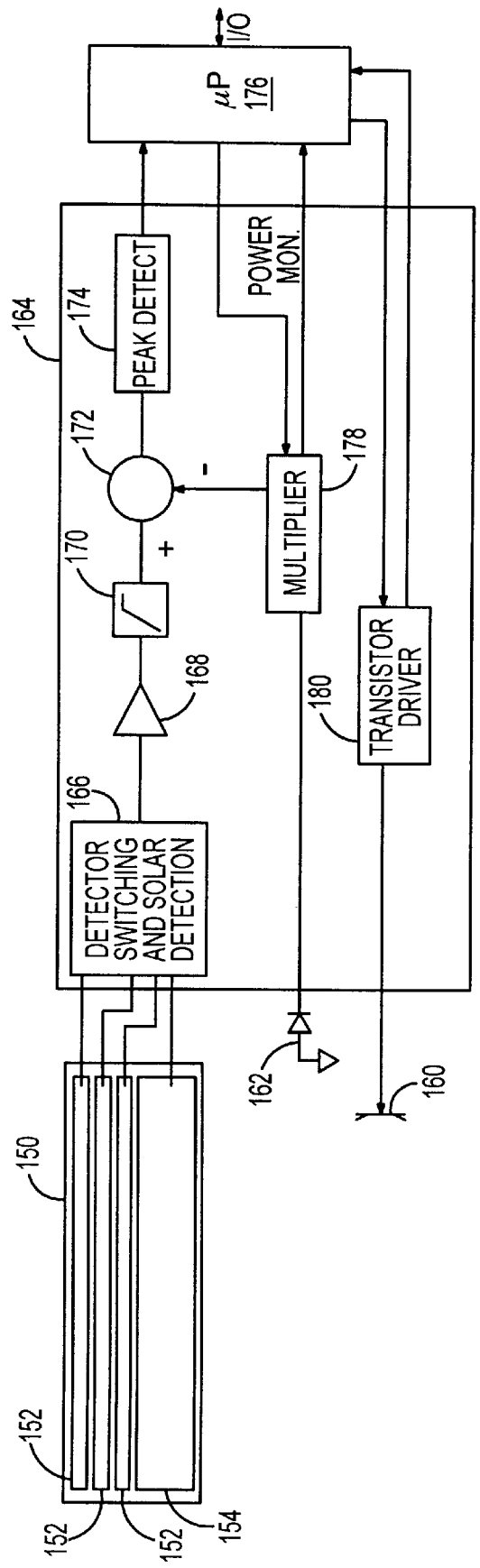
FIG. 9 is a depiction of the segmented optical detector of FIG. 8 in conjunction with a functional block diagram of a signal processor in accordance with the invention.

FIG. 9 is a depiction of the segmented optical detector 150, an optical emitter 160, and a transmit power detector 162 in conjunction with a functional block diagram of the signal processor 164. The first functional block 166 within the signal processor controls detector switching and solar detection. Within the functional block, signals can be detected from the detector elements 152 and 154 one at a time or in combination. In addition, detector elements exposed to direct sunlight can be turned off during the direct exposure in order to minimize interference. The signal processor also includes a preamplifier 168, a high pass filter 170, a comparator 172, and a peak detector 174 that process signals from the segmented optical detector.

The optical emitter 160 and the transmit power detector 162 are connected to a microprocessor 176 through the signal processor 164. Signals from the transmit power detector are compared to signals from the segmented detectors after being passed through a multiplier 178. The multiplier is set such that the gain of the transmit signals are equal to the return signal through the segmented detector when no obstruction is present. The multiplier constant can be adjusted, as needed, to compensate for long term drift in the electronics. Providing real-time feedback concerning the initial transmission power of the light reduces the chances of falsely detecting an obstruction when the light transmission power abruptly changes. The optical emitter is connected to the microprocessor through a transistor driver 180. The light emitter utilized with the parallel detector element arrangement preferably emits light that is wider (measured perpendicular to the window plane) than the light emitted for the perpendicular detector element arrangement. The wider beam provides reflected light that is better distributed across the segmented parallel detector elements.

Although the obstruction detection system has been described as utilizing either perpendicular or parallel detector elements, an obstruction detection system may include both perpendicular and parallel detector elements in a single module. A system utilizing a hybrid approach provides the benefits of high sensitivity to small objects that is provided by the perpendicular detector elements with the good sunlight compensation that is provided by the parallel detector elements. A hybrid signal processor is easily implemented in an ASIC because the basic building blocks within each of the two described signal processors are similar.

Although the obstruction detection system utilizing segmented detector arrays has been described with reference to automobile windows, the detection system can also be applied to obstruction detection within other defined areas. For example, the detection system may be applied to automatically closing doors either in automobiles or other structures. The obstruction detection system may also be applied to security systems such as building security systems. Specifically, the system may be applied to a window where the segmented detector elements and processor are configured to compensate for moving curtains or other disturbances.

What is claimed is:

1. A power window system comprising:
   a window frame;
   a window body movably disposed within said window frame, said window body and said window frame generally defining a window plane;
   a window motor connected to move said window body within said window frame;
   an optical emitter, oriented with respect to said window frame and said window body to emit optical energy within said window plane;
   an optical detector having segmented detector elements that are oriented with respect to said optical emitter to detect reflected portions of said optical energy from said optical emitter, said optical detector having a plurality of outputs associated with said segmented detector elements for outputting electrical signals in response to detection of said reflected portions of said optical energy; and
   means for processing said electrical signals from said plurality of outputs to determine the presence of an obstructing object within said window plane.

2. The power window system of claim 1 further including means, operatively associated with said processing means and said window motor, for suspending closure of said window body when said processing means indicates the presence of said obstructing object within said window plane.

3. The power window system of claim 1 wherein said optical emitter includes a fan generator lens that distributes said emitted optical energy in the general pattern of a fan within said window plane.

4. The power window system of claim 1 wherein said optical emitter includes a fan generator lens that distributes optical energy such that the intensity of reflected light is generally constant when received at said optical detector.

5. The power window system of claim 1 wherein said optical emitter and said optical detector are located together in a corner of said window frame.

6. The power window system of claim 5 wherein said optical emitter and said optical detector are located together in either the lower A pillar corner or the upper B pillar corner of said window frame.

7. The power window system of claim 1 wherein said optical detector has segmented detector elements that are generally perpendicular to said window plane.

8. The power window system of claim 7 wherein said segmented detector elements include a repeating pattern of commonly connected detector elements.

9. The power window system of claim 8 wherein said processing means includes means for performing a filtering algorithm that distinguishes electrical responses to small obstructions in said window plane from electrical responses caused by objects that are not obstructing said window plane.

10. The power window system of claim 1 wherein said optical detector has segmented detector elements that are generally in parallel with said window plane.

11. The power window system of claim 10 wherein said processing means includes means for identifying an active one of said segmented detector elements and for deactivating said segmented detector elements that are in direct contact with sunlight.

12. The power window system of claim 11 further including a transmit power monitor that is in optical contact with said optical emitter and in electrical contact with said processing means, said transmit power monitor having an output for generating electrical signals representative of an intensity of said optical energy emitted from said optical emitter, and said processing means including means for comparing said electrical signals from said plurality of outputs to said electrical signals from said transmit power monitor.

13. A detection system for detecting the presence of an object within a defined plane comprising:
   means for emitting optical energy within said defined plane;
   an optical detector having segmented detector elements, said optical detector being oriented generally parallel to said defined plane and said segmented detector elements being oriented generally perpendicular to said defined plane, said optical detector being oriented with respect to said emitting means such that portions of said emitted optical energy can be detected by said segmented detector elements upon a single reflection of said emitted optical energy; and
   means for processing signals from said segmented detector elements such that gradually varying optical energy incident on said detector elements is distinguished from sharply varying optical energy incident on said detector elements.

14. The detection system of claim 13 wherein said segmented detector elements form a repeating pattern of segmented detector elements that are connected to form detector groups of connected elements.

15. The detection system of claim 14 wherein each of said detector groups has a single output that is connected to said processing means.

16. The detection system of claim 15 wherein said processing means includes means for adding and subtracting signals from different combinations of said detector groups.

17. A power window system comprising:
   a window frame;
   a window body movably disposed within said window frame, said window body and said window frame generally defining a window plane;
   means for distributing optical energy throughout an upper portion of said window frame and within said window plane;
   an optical detector having a plurality of segmented detector elements that are oriented with respect to said distributing means to detect reflected portions of said optical energy from said distributing means, said plurality of segmented detector elements having outputs for outputting electrical signals in response to detection of said reflected portions of said optical energy; and means, connected to said outputs, for distinguishing interfering optical energy that is incident upon said plurality of segmented detector elements from optical energy that is reflected from an object that is located within said window plane and obstructing closure of said window body.

18. The power window system of claim 17 wherein said detector elements are segmented such that said elements are generally perpendicular to said window plane and divided into detector groups, said detector elements in said detector groups being electrically connected to common outputs, and said distinguishing means including circuits for spatially filtering said output electrical signals in order to detect small obstructing objects within said window plane.

19. The power window system of claim 17 wherein said detector elements are segmented such that said elements are generally parallel to said window plane, said optical detector having narrow segmented detector elements along one side of said optical detector and having relatively wide segmented detector elements, as compared to said narrow elements, along the opposite side of said optical detector, and said distinguishing means including means for deactivating segmented detector elements that are in direct contact with sunlight.

20. The power window system of claim 17 wherein a first portion of said detector elements are segmented such that said elements are generally perpendicular to said window plane and divided into detector groups, said detector elements in said detector groups being electrically connected to common outputs, and said distinguishing means including circuits for spatially filtering said output electrical signals in order to detect small obstructing objects within said window plane, and wherein said portion of said detector elements are segmented such that said elements are generally parallel to said window plane, said optical detector having narrow segmented detector elements along one side of said optical detector and having relatively wide segmented detector elements, as compared to said narrow elements, along the opposite side of said optical detector, and said distinguishing means including means for deactivating segmented detector elements that are in direct contact with sunlight.

* * * * *